US009785677B2

(12) United States Patent
Ma

(10) Patent No.: US 9,785,677 B2
(45) Date of Patent: Oct. 10, 2017

(54) METHOD AND SYSTEM FOR SORTING, SEARCHING AND PRESENTING MICRO-BLOGS

(71) Applicant: TENCENT TECHNOLOGY (SHENZHEN) COMPANY LIMITED, Shenzhen, Guangdong (CN)

(72) Inventor: Yao Ma, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 440 days.

(21) Appl. No.: 14/109,949

(22) Filed: Dec. 17, 2013

(65) Prior Publication Data
US 2014/0108388 A1 Apr. 17, 2014

Related U.S. Application Data

(63) Continuation of application No. PCT/CN2013/071325, filed on Feb. 4, 2013.

(30) Foreign Application Priority Data

Feb. 9, 2012 (CN) .......................... 2012 1 0028740

(51) Int. Cl.
G06F 17/30 (2006.01)
G06F 7/00 (2006.01)
G06Q 50/00 (2012.01)

(52) U.S. Cl.
CPC .... *G06F 17/3053* (2013.01); *G06F 17/30867* (2013.01); *G06Q 50/01* (2013.01)

(58) Field of Classification Search
None
See application file for complete search history.

(56) References Cited

U.S. PATENT DOCUMENTS 7,765,209 B1 7/2010 Khesin
8,145,636 B1 * 3/2012 Jeh .................... G06F 17/30707
 707/736

(Continued)

FOREIGN PATENT DOCUMENTS

CN 101004749 A 7/2007
CN 101305371 A 11/2008

(Continued)

OTHER PUBLICATIONS

International Search Report in international application No. PCT/CN2013/071325, mailed on May 16, 2013.

(Continued)

*Primary Examiner* — Jeffrey A Burke
(74) *Attorney, Agent, or Firm* — Oppedahl Patent Law Firm LLC

(57) ABSTRACT

Disclosed is a micro-blog sorting method, in which micro-blog information requested by a micro-blog requesting user is acquired, micro-blog posting user information and content information are extracted from the micro-blog information to score the micro-blog information, the micro-blog information is sorted according to the score and the micro-blog information is presented according to a sorted result. With the above micro-blog sorting method, the micro-blog posting user information as well as the content information in the micro-blog information are extracted to score the micro-blog information, the micro-blog information is sorted according to the score, and the micro-blog information related to the user is sorted close to the top, and thus it is convenient for the user to view the micro-blog information. In addition, a micro-blog sorting system and a micro-blog searching and presenting method and system are also provided.

22 Claims, 9 Drawing Sheets

(56) References Cited

U.S. PATENT DOCUMENTS

| | | | | |
|---|---|---|---|---|
| 8,244,720 | B2* | 8/2012 | Bihun | G06F 17/30864 707/723 |
| 8,606,792 | B1* | 12/2013 | Jackson | G06F 17/30699 707/748 |
| 8,751,917 | B2* | 6/2014 | Dhawan | G06Q 10/101 707/732 |
| 8,898,151 | B2* | 11/2014 | Lee | G06F 17/30699 707/723 |
| 8,954,451 | B2* | 2/2015 | Zendejas | G06F 17/30867 707/728 |
| 2007/0038646 | A1 | 2/2007 | Thota | |
| 2007/0061297 | A1 | 3/2007 | Bihun | |
| 2010/0042612 | A1 | 2/2010 | Gomaa | |
| 2010/0312769 | A1 | 12/2010 | Bailey | |
| 2011/0022602 | A1 | 1/2011 | Luo | |
| 2011/0087842 | A1 | 4/2011 | Lu | |
| 2011/0145234 | A1 | 6/2011 | Hu | |
| 2011/0178995 | A1* | 7/2011 | Suchter | G06F 17/30864 707/692 |
| 2011/0231296 | A1* | 9/2011 | Gross | G06Q 10/10 705/37 |
| 2011/0246457 | A1* | 10/2011 | Dong | G06Q 10/06 707/725 |
| 2011/0302103 | A1* | 12/2011 | Carmel | G06Q 30/0282 705/347 |
| 2011/0314039 | A1* | 12/2011 | Zheleva | G06F 17/30035 707/767 |
| 2012/0042020 | A1* | 2/2012 | Kolari | G06Q 10/107 709/206 |
| 2012/0117059 | A1* | 5/2012 | Bailey | G06F 17/30867 707/723 |
| 2012/0209850 | A1* | 8/2012 | Kikin-Gil | G06F 17/30696 707/738 |
| 2012/0265757 | A1 | 10/2012 | Bihun | |
| 2013/0159277 | A1* | 6/2013 | Liu | G06F 17/271 707/709 |
| 2013/0246170 | A1* | 9/2013 | Gross | G06Q 10/10 705/14.49 |
| 2014/0358929 | A1 | 12/2014 | Bailey et al. | |
| 2015/0172299 | A1 | 6/2015 | Khesin | |

FOREIGN PATENT DOCUMENTS

| | | |
|---|---|---|
| CN | 101561805 A | 10/2009 |
| CN | 101661474 A | 3/2010 |
| CN | 102016825 A | 4/2011 |
| CN | 102063488 A | 5/2011 |
| CN | 102088419 A | 6/2011 |
| CN | 102332006 A | 1/2012 |
| JP | H09231238 A | 9/1997 |
| JP | 2006185356 A | 7/2006 |
| JP | 2007334502 A | 12/2007 |
| JP | 2008225696 A | 9/2008 |
| JP | 2009508267 A | 2/2009 |
| JP | 2010500650 A | 1/2010 |
| JP | 2010218475 A | 9/2010 |
| KR | 20100125697 A | 12/2010 |
| KR | 1005510 B1 | 1/2011 |

OTHER PUBLICATIONS

English Translation of the Written Opinion of the International Search Authority in international application No. PCT/CN2013/071325, mailed on May 16, 2013.

Supplementary European Search Report in European application No. 13746647.0, mailed on Jul. 3, 2015.

Notification of the First Office Action of Japanese application No. 2014-515063, issued on Jan. 13, 2015.

Notification of the First Office Action of Korean application No. 10-2013-7031978, issued on Mar. 12, 2015.

Notification of the First Office Action of ARIPO application No. AP/P/2014/007382, issued on Oct. 8, 2015.

Search report in the First Office Action of Chinese application No. 201210028740.7, dated Jun. 30, 2015.

English translation of the Search report in the First Office Action of Chinese application No. 201210028740.7, dated Jun. 30, 2015.

First Office Action of Chinese application No. 201210028740.7, dated Jul. 21, 2015.

English translation of the First Office Action of Chinese application No. 201210028740.7, dated Jul. 21, 2015.

* cited by examiner

METHOD AND SYSTEM FOR SORTING, SEARCHING AND PRESENTING MICRO-BLOGS

CROSS REFERENCE TO RELATED APPLICATIONS

This is a continuation application of International Patent Application No. PCT/CN2013/071325, filed on Feb. 4, 2013, which claims priority to Chinese Patent Application No. 201210028740.7 filed on Feb. 9, 2012 by the applicant Tencent Technology (Shenzhen) Company Limited and entitled "method and system for sorting, searching and presenting micro-blogs", the disclosure of which is hereby incorporated by reference herein in its entirety.

TECHNICAL FIELD

The disclosure relates to network techniques, and in particular to a method and system for sorting, searching and presenting micro-blogs.

BACKGROUND

With development of network techniques, micro-blog has become an important platform for users to communicate with each other and present themselves. Users may acquire information of interest by searching micro-blogs.

Generally, in a traditional micro-blog sorting method, micro-blogs are sorted based on a timeline, and micro-blogs posted recently are sorted close to the top.

In the traditional micro-blog sorting method, micro-blogs of all users are mixed together and merely sorted based on the timeline, which results in that the users have to spend significant effort and time to find out the micro-blog(s) related to themselves and of interest from the numerous and complicated micro-blogs.

SUMMARY

According to an aspect of the disclosure, is would be helpful if we could provide a micro-blog sorting method which is convenient for a user to view micro-blocs.

The micro-blog sorting method includes: acquiring micro-blog information requested by a micro-blog requesting user; extracting micro-blog posting user information and content information from the micro-blog information to score the micro-blog information; sorting the micro-blog information according to the score; and presenting the micro-blog information according to the sorted result.

According to another aspect of the disclosure, it would be helpful if we could provide a micro-blog sorting system which is convenient for a user to view micro-blogs.

The micro-blog sorting system includes: a micro-blog information acquiring module, configured to acquire micro-blog information requested by a micro-blog requesting user; a scoring module, comprising a user information scoring module and a content information scoring module, wherein the user information scoring module is configured to extract micro-blog posting user information from the micro-blog information and to score the micro-blog information according to the micro-blog posting user information; and the content information scoring module is configured to extract content information from the micro-blog information and to score the micro-blog information according to the content information; a sorting module, configured to sort the micro-blog information according to the score; and a presenting module, configured to present the micro-blog information according to a sorted result.

According to yet another aspect of the disclosure, a micro-blog searching method which is convenient for a user to view micro-blogs is provided.

In the micro-blog searching method, a search result is sorted by applying the micro-blog sorting method, the acquiring micro-blog information requested by the micro-blog requesting user includes: searching the micro-blog using a key word input by the micro-blog requesting user to acquire the micro-blog information requested by the micro-blog requesting user.

According to yet another aspect of the disclosure, a micro-blog searching system which is convenient for a user to view micro-blogs is provided.

The micro-blog searching system includes the micro-blog sorting system, and the micro-blog information acquiring module is configured to search the micro-blogs using a key word input by the micro-blog requesting user, and to acquire the micro-blog information requested by the micro-blog requesting user.

According to yet another aspect of the disclosure, a micro-blog presenting method which is convenient for a user to view micro-blogs is provided.

In the micro-blog presenting method, a search result is sorted by applying the micro-blog sorting method, the acquiring micro-blog information requested by a micro-blog requesting user includes: acquiring the micro-blog information requested by the micro-blog requesting user according to micro-blog requesting information corresponding to a user identifier.

According to yet another aspect of the disclosure, a micro-blog presenting system which is convenient for a user to view micro-blocs is provided.

The micro-blog presenting system includes the micro-blog sorting system, and the micro-blog information acquiring module is configured to acquire the micro-blog information requested by the micro-blog requesting user according to micro-blog requesting information corresponding to a user identifier.

According to the various aspects the disclosure, the micro-blog posting user information as well as the content information in the micro-blog information are extracted to score the micro-blog information, the micro-blog information is sorted according to the score. Accordingly, the micro-blog information related to the user is sorted to close to the top, and thus it is convenient for the user to view the micro-blog information.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

These and other sample aspects of the disclosure will be described in the detailed description and the claims that follow, and in the accompanying drawings, wherein:

Figure 1:
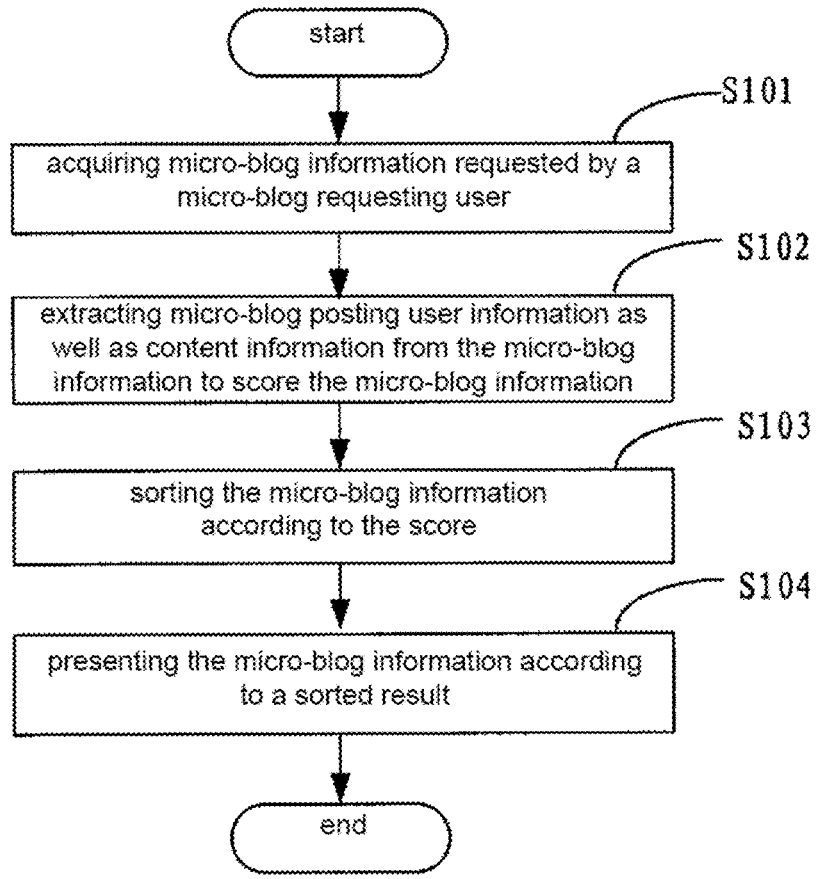
FIG. 1 is a flow chart of a micro-blog sorting method according to an embodiment.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

Reference throughout this specification to "an example." "an embodiment." or the like in the singular or plural means that one or more particular features, structures, or characteristics described in connection with an embodiment is included in at least one embodiment of the present disclosure. Thus, the appearances of the phrases "an example." "an embodiment." or the like in the singular or plural in various places throughout this specification are not necessarily all referring to the same embodiment. Furthermore, the particular features, structures, or characteristics may be combined in any suitable manner in one or more embodiments.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises." and/or "comprising." when used in this specification, specify the presence of stated features, operations, elements, and/or components, but do not preclude the presence or addition of one or more other features, operations, elements, components, and/or groups thereof.

Although FIGS. 1 to 6 illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

In an embodiment, as shown in FIG. 1, a micro-blog sorting method includes steps as follows.

At step S101, micro-blog information requested by a user is acquired.

At step S102, micro-blog posting user information as well as content information are extracted from the micro-blog information to score the micro-blog information.

In an example, if the micro-blog posting user information and the content information in the micro-blog information are highly correlated with the micro-blog requesting user, the micro-blog information is given a high score.

At step S103, the micro-blog information is sorted according to the score.

In an example, sorting the micro-blog information according to the score means that, the higher the score of the micro-blog information is, the closer to the top the micro-blog is sorted.

At step S104, the micro-blog information is presented according to a sorted result.

According to the above micro-blog sorting method, the micro-blog posting user information as well as the content information in the micro-blog information are extracted to score the micro-blog information, the micro-blog information is sorted according to the score. Accordingly, micro-blog information related to the user may be sorted close to the top, and thus it is convenient for the user to view the micro-blog information.

Figure 2:
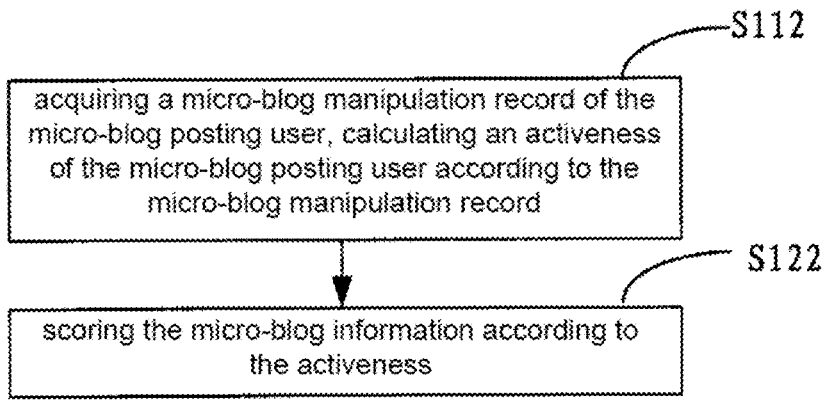
FIG. 2 is a flow chart illustrating operations for extracting micro-blog posting user information from micro-blog information to score the micro-blog information according to an embodiment.

In an embodiment, as shown in FIG. 2, step S102 of extracting the micro-blog posting user information from the micro-blog information to score the micro-blog information includes steps as follows.

At step S112, a micro-blog manipulation record of the micro-blog posting user is acquired, and an activeness of the micro-blog posting user is calculated according to the micro-blog manipulation record.

In an embodiment, an identifier (ID) of the micro-blog posting user may be used to search a database, in which the micro-blog manipulation records of users are stored, for the micro-blog manipulation record corresponding to the user ID. In an example, the micro-blog posting user may have posted several micro-blogs in his micro-blog system, and the micro-blog manipulation record may include the following information: whether the user is a VIP user, a micro-blog updating frequency, a micro-blog re-post rate, a micro-blog originality rate, the number of times that the micro-blogs are forwarded and commented, an average number of words of the micro-blogs, a laughter-provoking score and the like. In an embodiment, the laughter-provoking score may be acquired according to the laughter-provoking scores of the micro-blogs of the micro-blog posting user scored by other users.

The micro-blog manipulation record of the micro-blog posting user reflects the activeness of the micro-blog posting user. Specifically, if the micro-blog posting user is a VIP user, or if he/she has a high micro-blog updating frequency, micro-blog re-post rate, micro-blog originality rate, or laughter-provoking score, or if he/she has micro-blogs which are forwarded and commented for a large number of times or which have a large average number of words, the activeness of the micro-blog posting user may be set high accordingly.

At step S122, the micro-blog information is scored according to the activeness.

In an example, the high activeness of the micro-blog posting user may increase the score of the micro-blog accordingly, since the micro-blog posted by the micro-blog posting user with high activeness is more liable to arouse users' interest.

In the embodiment, the micro-blog information of the micro-blog posting user with a high activeness is scored high, and the micro-blog information with a high score is sorted close to the top. In this case, the micro-blog information which is more liable to arouse user's interest is sorted close to the top, and thus it is convenient for the user to view the micro-blog information of interest.

Figure 3:
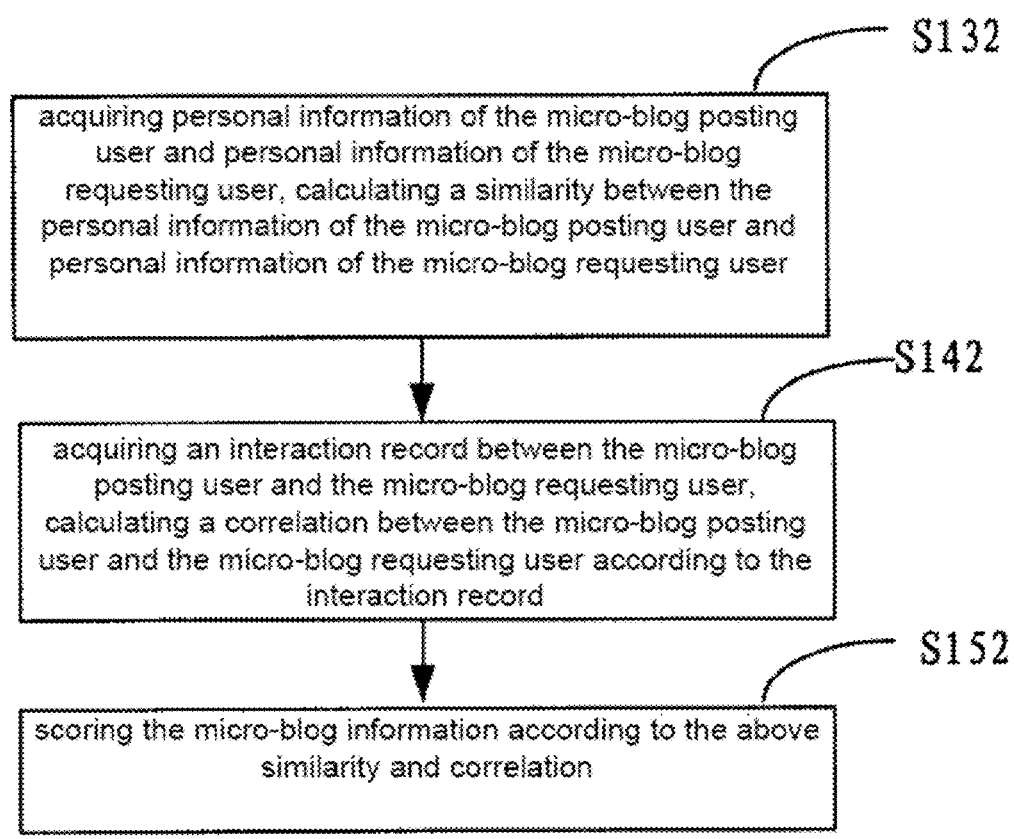
FIG. 3 is a flow chart illustrating operations for extracting micro-blog posting user information from micro-blog information to score the micro-blog information according to another embodiment.

In an embodiment, as shown in FIG. 3, step S102 of extracting the micro-blog posting user information from the micro-blog information to score the micro-blog information includes steps as follows.

At step S132, personal information of the micro-blog posting user and personal information of the micro-blog requesting user are acquired, and a similarity between the personal information of the micro-blog posting user and personal information of the micro-blog requesting user is calculated.

In an embodiment, a user ID may be used to search a database, in which personal information of users are stored, for the personal information corresponding to the user ID. Specifically, the personal information may include: interests and hobbies, an educational background, a speciality, a region, a personalized signature, stored-up micro-blog information, the number of mutual friends, user-type information and the like. In an embodiment, the user type may be divided into: science & technology-type, entertainment-type, sports-type, art-type, politics-type and the like. In an example, the user-type information includes a user-type vector with a component thereof representing the score for the user's inclination to be of a certain user-type. For example, a first component of the user-type vector may be defined to represent a score for an inclination to be of the science & technology-type, and a second component may be defined to represent a score for an inclination to be of the entertainment-type, and so forth; if the score for the user's inclination to be of the science & technology-type is 3 and the score for the user's inclination to be of the entertainment-type is 4, then the user-type vector may be represented as (3, 4 . . . ). In an example, a user type corresponding to a component with the highest score in the components of the user-type vector may be selected as the user type of the user.

In an embodiment, the user-type vector may be set by the user manually, or may be acquired by statistically analyzing user types of the micro-blog users concerned by the user and those of the user's friends. For example, if the number of users of the science & technology-type among the micro-blog users concerned by the user and the user's friends is 5, then the component corresponding to the science & technology-type in the user-type vector may be set as 5.

In an embodiment, if the users have same interests and hobbies or categories into which their interests and hobbies are classified are the same (e.g., the art category), then the score of the similarity between the micro-blog posting user and the micro-blog requesting user may be increased. In an embodiment, the category into which the user's interests and hobbies are classified may be searched for in a database, in which categories into which interests and hobbies are classified are stored. Accordingly, if the users have a same educational background (e.g., bachelors, or above PhDs), then the score of the similarity between the users may also be increased. Similarly, if the users have a same speciality or a branch into which their specialities are classified, or the users are in a same region or area, or the users have a same keyword in their personalized signatures, or the users have same micro-blog information stored up, or the users have similar user-type information, or the number of mutual friends between the users exceeds a preset threshold, then the score of the similarity between the users may also be increased. In an embodiment, the similarity of the user-type information may also be acquired by calculating a distance between their user-type vectors. The smaller the distance between the two user-type vectors is, the higher the similarity of the user-type information is, and accordingly, the higher the similarity between the users is.

At step S142, an interaction record between the micro-blog posting user and the micro-blog requesting user is acquired, a correlation between the micro-blog posting user and the micro-blog requesting user is calculated according to the interaction record.

In an embodiment, the interaction record includes records of citing, visiting, commenting and forwarding between the users. Specifically, if the number of times for the citing, visiting, commenting and forwarding between the users is large, then the correlation between the users may be set high accordingly.

At step S152, the micro-blog information is scored according to the above similarity and correlation.

In an example, if there is a high similarity or correlation between the micro-blog posting user and the micro-blog requesting user, the score of the micro-blog information may be increased.

In the embodiment, if there is a high similarity or correlation between the personal information of the micro-blog posting user and that of the micro-blog requesting user, the micro-blog information is also scored high. The micro-blog information with a high score is sorted close to the top and is more liable to arouse the micro-blog requesting users' interest, and thus it is convenient for the user to view the micro-blog information of interest.

In an embodiment, step S102 of extracting the micro-blog posting user information from the micro-blog information to score the micro-blog information includes steps S112 to S152. The scoring of the micro-blog information in step S152 may be performed based on the scoring of the micro-blog information in step S122, i.e., both the score acquired according to the activeness of the micro-blog posting user and the score acquired according to the similarity as well as the correlation between the personal information of the micro-blog posting user and that of the micro-blog requesting user are taken into account to get a comprehensive score of the micro-blog information, and each of the scores may be set a respective proportion of the comprehensive score.

Figure 4:
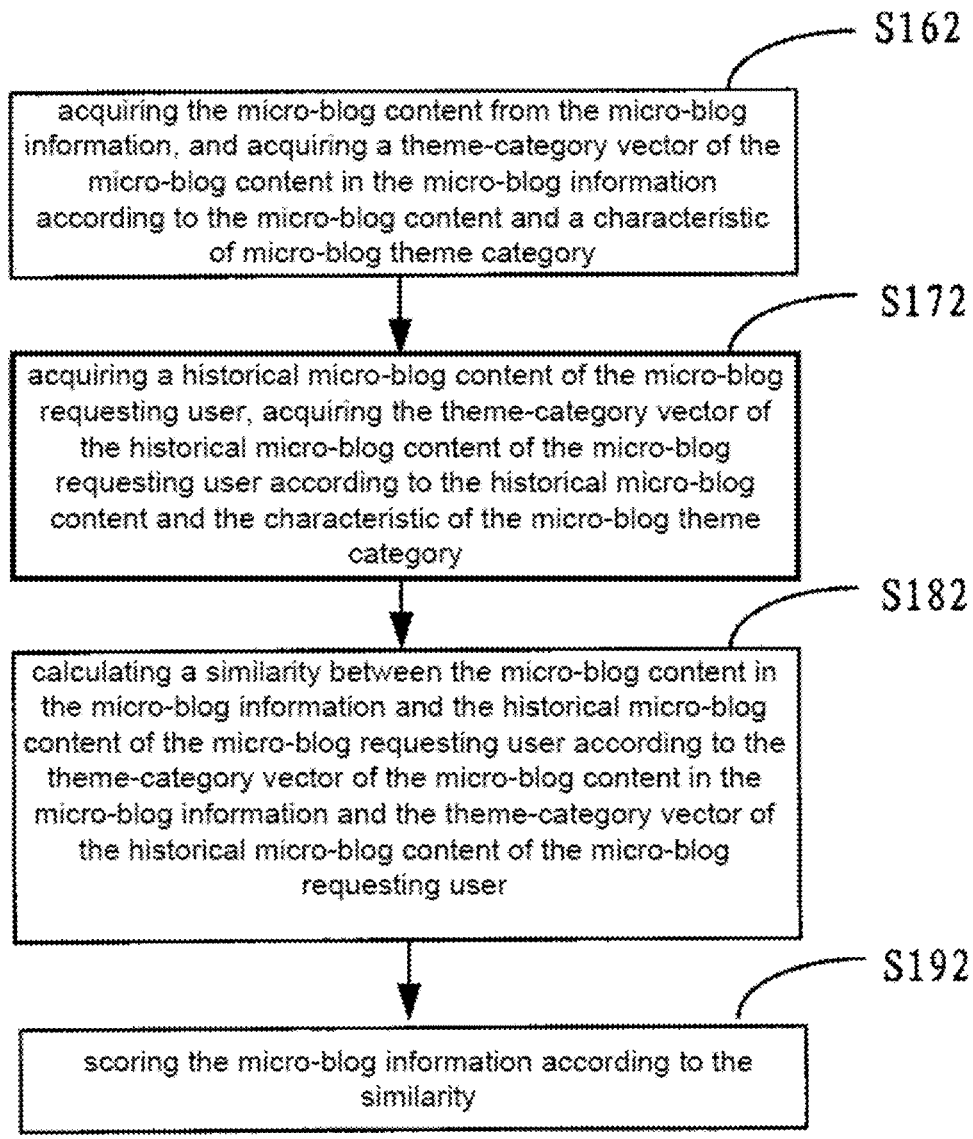
FIG. 4 is a flow chart illustrating operations for extracting content information from micro-blog information to score the micro-blog information according to an embodiment.

In an embodiment, as shown in FIG. 4, step S102 of extracting the content information from the micro-blog information to score the micro-blog information in include step as follows.

At step S162, the micro-blog content is acquired from the micro-blog information, and a theme-category vector of the micro-blog content in the micro-blog information is acquired according to the micro-blog content and a characteristic of micro-blog theme category.

In an example, the micro-blog content includes a text content of the micro-blog, i.e., the content posted by the micro-blog posting user, and may also include a comment content of the micro-blog. In an embodiment, if the number of words for the micro-blog content is not large, several pieces of micro-blog contents, which are posted by the micro-blog posting user within a period (for example, a preset period) from the time point at which the micro-blog is posted, may be acquired and combined.

In an example, the micro-blog theme category includes: politics and military affairs, culture and art, finance-economics and stock, emotion and life, social and legal affairs, entertainment and gossip, science & technology and network, health and food, physical culture and sports, automobile and house property, education and job hunting, fashion and travel, and the like. In an example, each component of the theme-category vector represents a score for a micro-blog content's inclination to be classified into a certain micro-blog theme category. For example, a first component of the theme-category vector represents a score for an Inclination to be of the politics and military affairs category, and the second component represents a score for an inclination to be of the culture and art category, and so forth. The theme-category vector (5, 10, . . . ) represents that the score for the micro-blog content's inclination to be classified into the politics and military affairs category is 5, and the score for the micro-blog content's inclination to be classified into the culture and art category is 10. In an example, a micro-blog theme category corresponding to the component with the highest score may be selected as the micro-blog theme category into which the micro-blog contents are classified.

Specifically, characteristics of each of the micro-blog theme categories may be trained in advance. Further, for example, micro-bog contents may be classified by using an existing naive Bayes text classification algorithm, to acquire a theme-category vectors for each of the micro-blog contents, description of which will be omitted here.

At step S172, a historical micro-blog content of the micro-blog requesting user is acquired, and the theme-category vector of the historical micro-blog content of the micro-blog requesting user is acquired according to the historical micro-blog content and the characteristic of the micro-blog theme category.

Specifically, micro-blog contents posted by the micro-blog posting user within a recent period (for example, a preset period) may be acquired. In an example, after the theme-category vectors of several pieces of the micro-blog contents are acquired, the several vectors may be averaged as the theme-category vector of the historical micro-blog content of the micro-blog requesting user.

At step S182, a similarity between the micro-blog content in the micro-blog information and the historical micro-blog content of the micro-blog requesting user is calculated according to the theme-category vector of the micro-blog content in the micro-blog information and the theme-category vector of the historical micro-blog content of the micro-blog requesting user.

Specifically, the similarity between the micro-blog content in the micro-blog information and the historical micro-blog content of the micro-blog requesting user may be calculated by calculating the distance between the above two theme-category vectors. In an example, the smaller the distance is, the higher the similarity is set.

At step S192, the micro-blog information is sorted according to the similarity.

In an example, the higher the similarity is, the higher the score of the micro-blog information is.

In the embodiment, if there is a high similarity between the micro-blog content in the micro-blog information and the historical micro-blog content of the micro-blog requesting user, then the micro-blog information is also scored high, and the micro-blog information with a high score is sorted close to the top and is more liable to arouse the micro-blog requesting users' interest, and thus convenient for the user to view the micro-blog information of interest.

Figure 5:
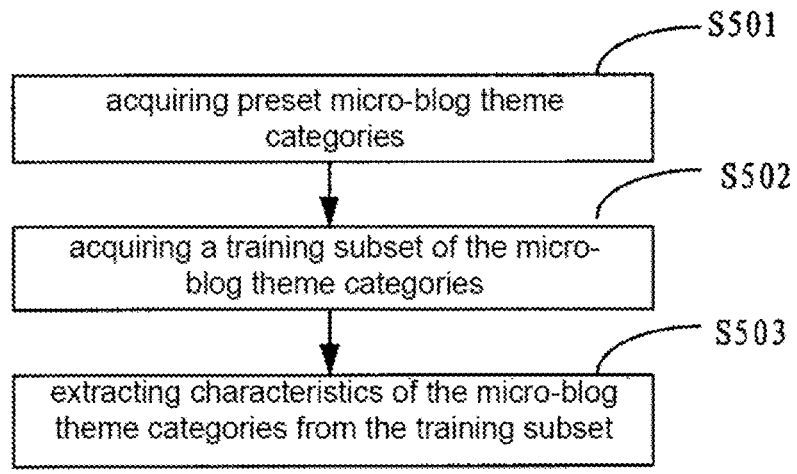
FIG. 5 is a flow chart illustrating operations for training a characteristic of a micro-blog theme category according to an embodiment.

In an embodiment, as shown in FIG. 5, before extracting the content information from the micro-blog information to score the micro-blog information in step S102, it may be necessary to train the characteristics of the micro-blog theme categories in advance, and the above micro-blog sorting method also includes steps as follows.

At step S501, a preset micro-blog theme category is acquired.

In an example, the micro-blog theme category includes: politics and military affairs, culture and art, finance-economics and stock, emotion and life, social and legal affairs, entertainment and gossip, science-technology and network, health and food, physical culture and sports, automobile and house property, education and job hunting, fashion and travel, and the like.

At step S502, a training subset of the micro-blog theme category is acquired.

Figure 6:
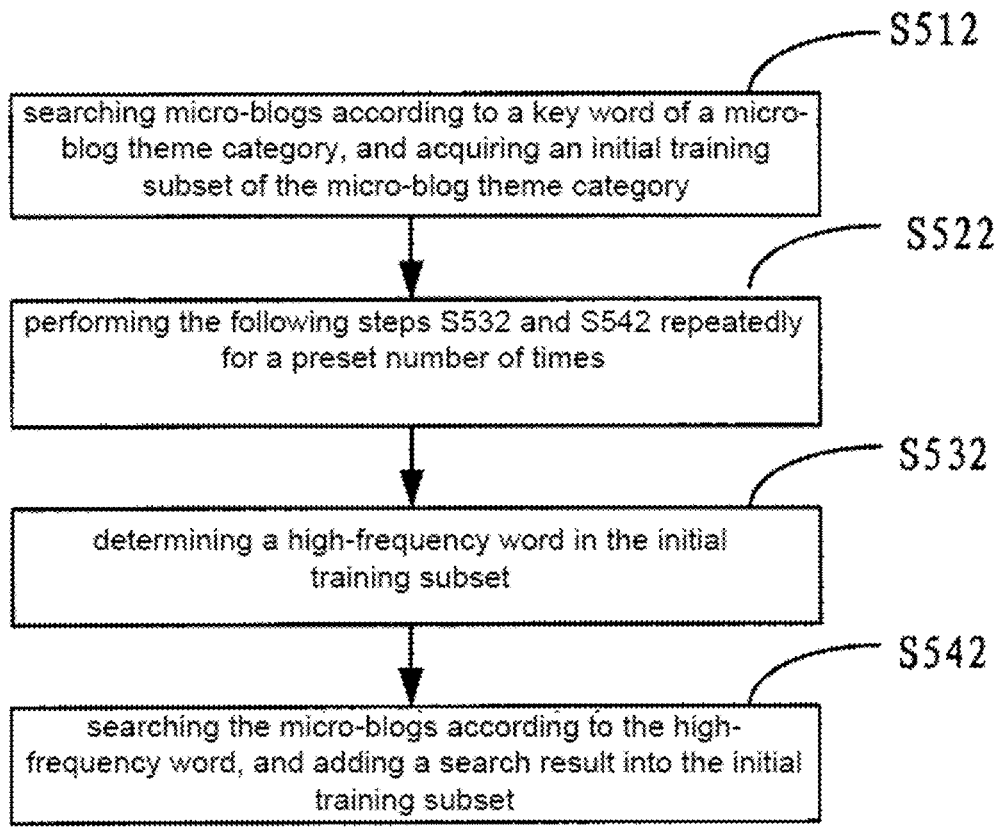
FIG. 6 is a flow chart illustrating operations for acquiring a training subset of a micro-blog theme category according to an embodiment.

In an example. In order to better extract the characteristic of the theme category from the training subset, micro-blog training samples may be acquired as many as possible within a certain range. In an embodiment, as shown in FIG. 6, the specific process of step S502 includes step as follows: at step S512 the micro-blogs are searched using a key word of a respective micro-blog theme category, and an initial training subset of the micro-blog theme category is acquired; at step S522, the following steps S532 and S542 are performed repeatedly for a preset number of times; at step S532, a high-frequency word determined in the initial training subset; and at step S542, the micro-blogs are searched using the high-frequency word, and a search result is added into the initial training subset.

Specifically, a name of a micro-blog theme category and split words thereof may be regarded as key words of the micro-blog theme category. For example, as for the politics and military affairs category, it is possible to regard the words "politics", "military affair" as well as "politics and military affairs" as the key words of this category, and search the micro-blogs using these key words to acquire the initial training subset of this category. Further, after the initial training subset is pre-processed, processes of splitting words and/or filtering stop words may be performed on the initial training subset, and the high-frequency word in the initial training subset may be determined. Further, it is possible to continue to perform a search by using a high-frequency word or any combination of high frequency words as a key word to acquire more training samples of the micro-blogs. Additionally, the steps of determining the high-frequency word in the initial training subset, searching the micro-blogs by using the high-frequency word as the key word, and adding the search result into the initial training subset, may be performed repeatedly for a preset number of times.

Figure 7:
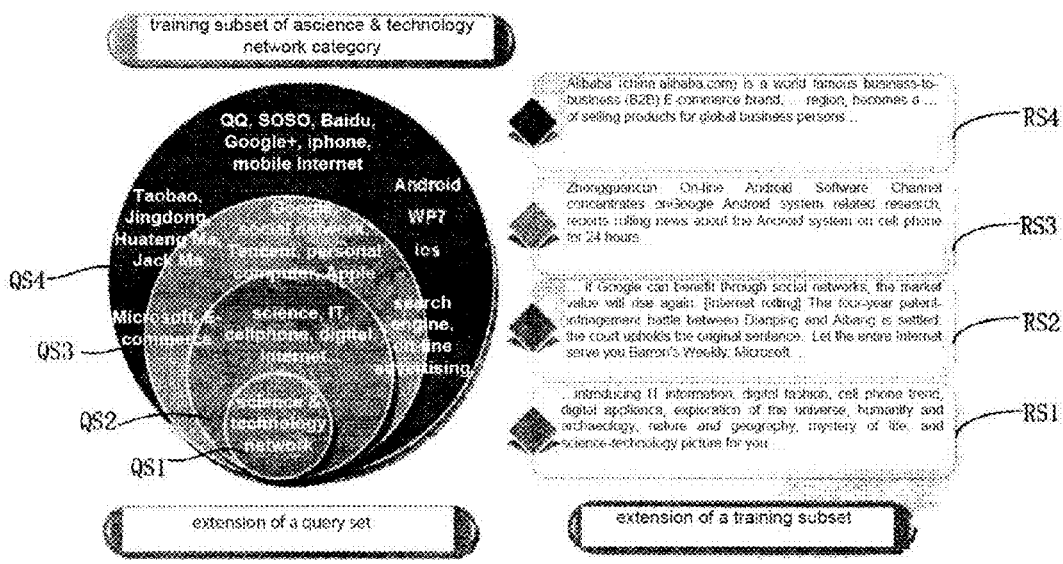
FIG. 7 is a schematic diagram of acquiring a training subset of a science-technology and network category according to an embodiment.

For example, as shown in FIG. 7, the words "science technology", "network", "science technology network" may be added into a query set QS1, and the micro-blogs may be searched by using the words in QS1 as the key words, to acquire a training subset RS1; the high-frequency words in RS1 are determined as, for example, "science, IT, mobile phone, data, internet", etc., and the determined high-frequency words are added into QS1 to acquire QS2; the micro-blogs are searched by using a word or any combination of words in QS2 as a key word, the search results of the micro-blogs are added into RS1 to acquire RS2; the high-frequency words in RS2 are determined, and the determined high-frequency words are added into QS2 to acquire QS3; the micro-blogs are searched by using a word or any combination of words in QS3 as a key word, and search results of the micro-blogs are added into RS2 to acquire RS3; and so forth for QS4 and RS4; and the number of the samples in the training subset may be enlarged by performing the above steps of determining and searching repeatedly.

According to the method for acquiring the training subset of the micro-blog theme category in the embodiment, a large number of training samples of the micro-blogs may be acquired for each theme category, which provides a basis for extracting the characteristics of each of the micro-blog theme categories from the training subset.

At step S503, the characteristic of the micro-blog theme category is extracted from the training subset.

Specifically, an existing classified training approach may be employed to train the micro-blog contents in the training subset of each of the theme categories to extract the characteristic of each of the theme categories, description of which will be omitted here.

In an embodiment, before step S104, the micro-blog content in the micro-blog information is classified according to the preset micro-blog presenting category, and the presenting category into which the micro-blog content is classified is acquired.

Specifically, the presenting category may include the micro-blog theme categories mentioned above, such as the politics and military affairs category, culture and art category, finance-economics and stock category, and so on. The micro-blog theme category into which the micro-blog content is classified may be acquired according to the acquired theme-category vector of the micro-blog content in the micro-blog information in step S162, and the theme category corresponding to the component with the highest score in the theme-category vector may be selected as the micro-blog theme category into which the micro-blog content is classified.

In an embodiment, in addition to the micro-blog theme category, other presenting categories such as a friend category, a location category, a laughter-provoking category, a help-seeking and forwarding category, and an advertisement and activity category may also be added. Whether the micro-blog information is classified into the friend category may be determined according to whether the micro-blog posting user and the micro-blog requesting user are friends. In an embodiment, IDs of the micro-blog posting user and the micro-blog requesting user may be used to search a database, in which friendship correspondences are stored, to see whether the micro-blog posting user and the micro-blog requesting user are friends. Whether the micro-blog information is classified into the location category may be determined based on whether addresses of the micro-blog posting user and the micro-blog requesting user are in the same region (may be set as county, district, etc.). Whether the micro-blog information is classified into the laughter-provoking category may be determined by searching a database, in which laughter-provoking scores of users are stored, with the ID of the micro-blog posting user and judging whether the searched out laughter-provoking score of the user is greater than the preset threshold. In an embodiment, the laughter-provoking score of the user may be based on the laughter-provoking scores scored by other users. Whether the micro-blog information is classified into the help-seeking and forwarding category or the advertisement and activity category may be determined based on appearance of high-frequency words related to the help-seeking or the advertisement.

In an embodiment, the presenting category of the micro-blog also includes a hot-topic category. Specifically, a webpage content may be parsed to acquire a high-frequency record; the high-frequency record may be scored according to the historical micro-blog content of the micro-blog requesting user; the micro-blogs in the search result list may be selected as the hot-topic category according to the score of the high-frequency record.

In an example, the webpage content may be parsed according to an existing open-source tool Html-parser to acquire a phrase of which the occurrence number exceeds a preset threshold. i.e., a high-frequency record. Further, the high-frequency record may be scored according to the similarity between the high-frequency record and the historical micro-blog content of the micro-blog requesting user. Specifically, the number of times that the high-frequency record occurs in the micro-blog contents which are posted, forwarded and commented by the micro-blog requesting user may be determined, and the high-frequency record is scored according to the number of times. Finally, the high-frequency record of which score is at a highest level (at which there may be a preset number of high-frequency records) may be selected and the micro-blog information in which the high-frequency record occurs in the micro-blog contents may be selected, and thus the micro-blog information is classified into the hot-topic category.

In this embodiment, the specific process of step S104 includes: presenting the micro-blog information according to the presenting category into which the micro-blog contents are classified as well as the above sorted result.

Specifically, the micro-blog information may be presented according to each of the presenting categories, and the micro-blog information with a high score is sorted close to the top in each of the presenting categories.

In this embodiment, the micro-blog information is divided into several presenting categories for presenting, which is convenient for the users to select their interested micro-blog categories to view, and thus is convenient for the users' manipulation. In addition, each of presenting categories is presented according to a descending order of the scores of the micro-blogs; for the micro-blog sorted close to the top, the activeness of the micro-blog posting user is higher, or the similarity between the personal information of the micro-blog posting user and the personal information of the micro-blog requesting user is higher, or the correlation between the micro-blog posting user and the micro-blog requesting user is higher, and thus it is convenient for the users to view the micro-blogs related to themselves and of interest.

Figure 8:
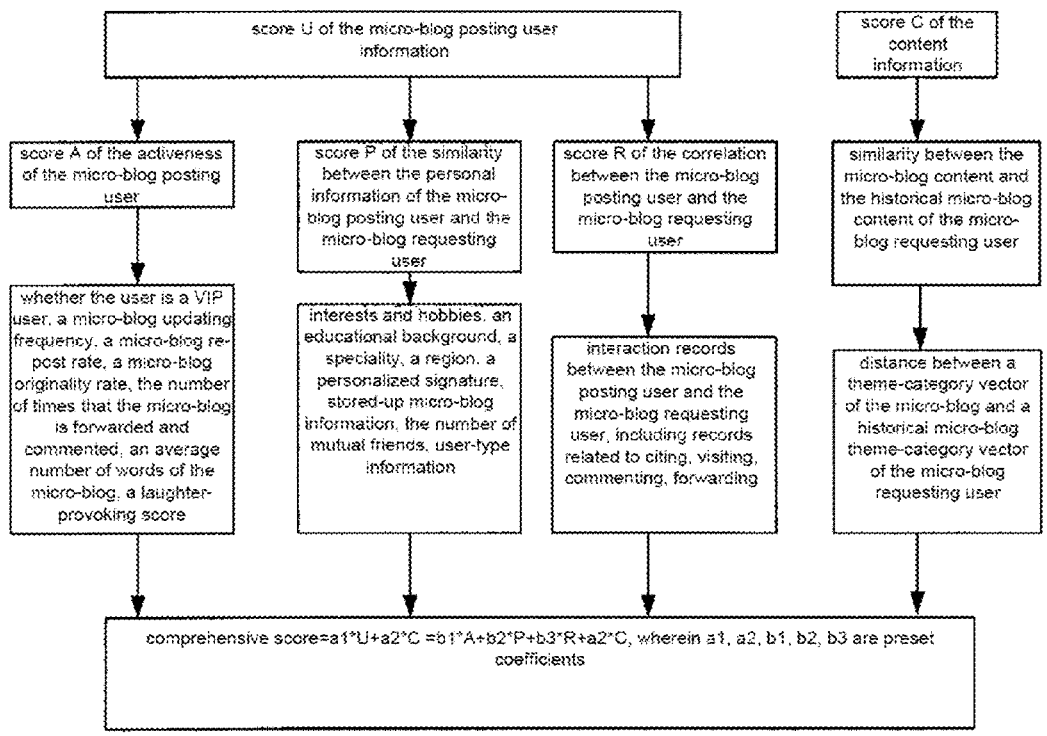
FIG. 8 is a schematic diagram illustrating a principle of the micro-blog sorting method according to an embodiment.

FIG. 8 is a schematic diagram of the principle of the micro-blog sorting method according to an embodiment.

In the micro-blog sorting method, the micro-blog information may be scored according to the micro-blog posting user information and the content information, and a score of the micro-blog posting user information is denoted as U, and a score of the content information is denoted as C. The score U of the micro-blog posting user information may be calculated according to a score A of the activeness of the micro-blog posting user, a score P of the similarity between the personal information of the micro-blog posting user and the micro-blog requesting user, and a score R of the correlation between the micro-blog posting user and the micro-blog requesting user. The score A of the activeness of the micro-blog posting user may be acquired according to the following information: whether the user is a VIP user, a micro-blog updating frequency, a micro-blog re-post rate, a micro-blog originality rate, the number of times that the micro-blog is forwarded and commented, an average number of words of the micro-blog, a laughter-provoking score and the like; the score P of the similarity between the personal information of the micro-blog posting user and the micro-blog requesting user may be acquired according to the following information: interests and hobbies, an educational background, a speciality, a region, a personalized signature, stored-up micro-blog information, the number of mutual friends, user-type information and the like; the score R of the correlation between the micro-blog posting user and the micro-blog requesting user may be acquired according to interaction records between the micro-blog posting user and the micro-blog requesting user, including records related to citing, visiting, commenting, forwarding and so on. The score C of the content information of the micro-blog may be calculated according to the similarity between the micro-blog content and the historical micro-blog content of the micro-blog requesting user, and the similarity may be calculated according to a distance between a theme-category vector of the micro-blog and a historical micro-blog theme-category vector of the micro-blog requesting user. Finally, the above scores may be integrated to acquire a comprehensive score of the micro-blog information. In an embodiment, the comprehensive score=$a1*U+a2*C=b1*A+b2*P+b3*R+a2*C$, where a1, a2, b1, b2, b3 are preset coefficients.

Figure 9:
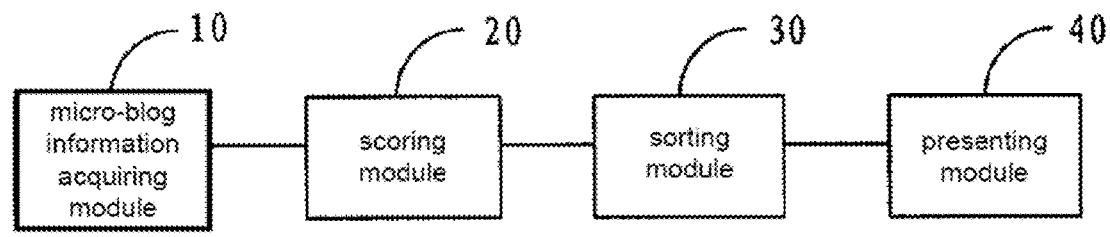
FIG. 9 is a schematic diagram illustrating a structure of a micro-blog sorting system according to an embodiment.

In an embodiment, as shown in FIG. 9, a micro-blog sorting system includes: a micro-blog information acquiring module 10, a scoring module 20, a sorting module 30 and a presenting module 40.

The micro-blog information acquiring module 10 is configured to acquire micro-blog information requested by a micro-blog requesting user.

Figure 10:
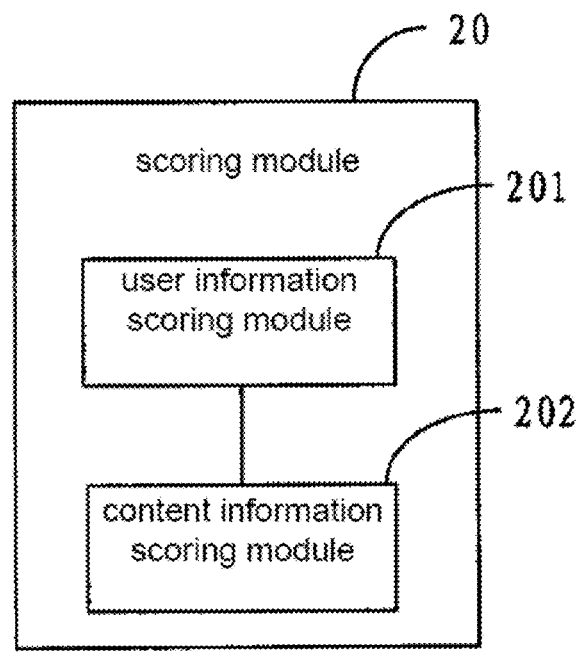
FIG. 10 is a schematic diagram illustrating a structure of a scoring module according to an embodiment.

As shown in FIG. 10, the scoring module 20 includes a user information scoring module 201 and a content information scoring module 202. The user information scoring module 201 is configured to extract micro-blog posting user information from the micro-blog information and to score the micro-blog information according to the micro-blog posting user information. The content information scoring module 202 is configured to extract content information from the micro-blog information and to score the micro-blog information according to the content information.

The micro-blog information is scored by the user information scoring module 201 and the content information scoring module 202 to obtain a comprehensive score. In an example, if the micro-blog posting user information as well as the content information in the micro-blog information are highly correlated with a micro-blog requesting user, then the micro-blog information has a high comprehensive score.

The sorting module 30 is configured to sort the micro-blog information according to the above score.

In an example, the sorting module 30 sorts the micro-blog information according to the comprehensive score, i.e., the higher the score of the micro-blog information is, the closer to the top it is sorted.

The presenting module 40 is configured to present the micro-blog information according to a sorted result.

According to the above micro-blog sorting system, the micro-blog posting user information as well as the content information in the micro-blog information are extracted, the micro-blog is scored, and the micro-blog information is sorted according to the score. In this case, the micro-blog information related to the user may be sorted to the top, thus convenient for the user to view the micro-blog information.

Figure 11:
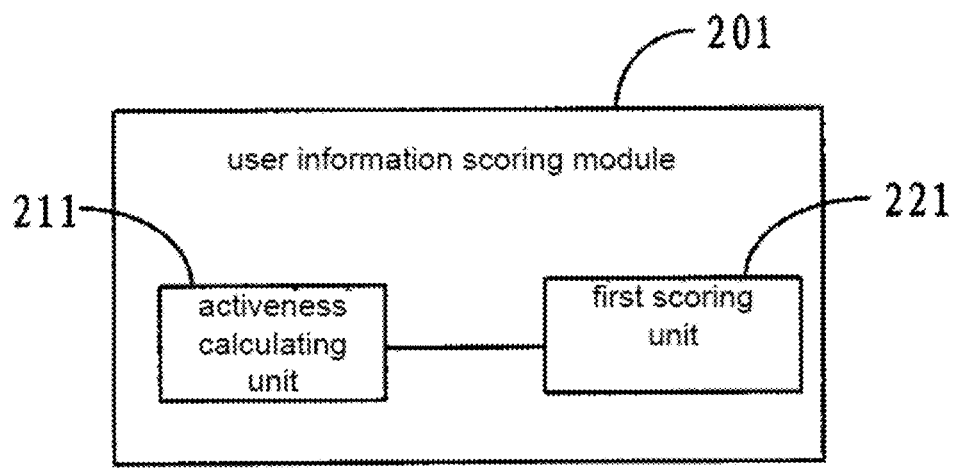
FIG. 11 is a schematic diagram illustrating a structure of a user information scoring module according to an embodiment.

In an embodiment, as shown in FIG. 11, the user information scoring module 201 includes an activeness calculating unit 211 and a first scoring unit 221.

The activeness calculating unit 211 is configured to acquire a micro-blog manipulation record of the micro-blog posting user, and to calculate the activeness of the micro-blog posting user according to the micro-blog manipulation record.

In an embodiment, the activeness calculating unit 211 may use an ID of the micro-blog posting user to search for the micro-blog manipulation record corresponding to the user ID in a database in which micro-blog manipulation records of users are stored. In an example, the micro-blog manipulation record may include: whether the user is a VIP user, a micro-blog updating frequency, a micro-blog re-post rate, a micro-blog originality rate, the number of times that the micro-blogs are forwarded and commented, an average number of words of the micro-blogs, a laughter-provoking score and the like. In an embodiment, the laughter-provoking score may be acquired according to the laughter-provoking score of the micro-blog of the micro-blog posting user scored by other users.

The micro-blog manipulation record of the micro-blog posting user reflects the activeness of the micro-blog posting user. Specifically, if the micro-blog posting user is a VIP user, or if he/she has a high the micro-blog updating frequency, micro-blog re-post rate, micro-blog originality rate or laughter-provoking score, or if he/she has micro-blogs which are forwarded and commented for a large number of times, or have a large average number of words, the activeness of the micro-blog posting user may be set high accordingly.

The first scoring unit 221 is configured to score the micro-blog information according to the activeness.

In an example, when the micro-blog posting user has a high activeness, the first scoring unit 221 may increase the score of the micro-blog accordingly, since the micro-blog posted by the micro-blog posting user with a high activeness is more liable to arouse user's interest.

In the embodiment, the micro-blog information of the micro-blog posting user with a high activeness is scored high, and the micro-blog information with a high score is sorted close to the top. In this case, the micro-blog information which is more liable to arouse user's interest is sorted close to the top, and thus it is convenient for the user to view the micro-blog information of interest.

Figure 12:
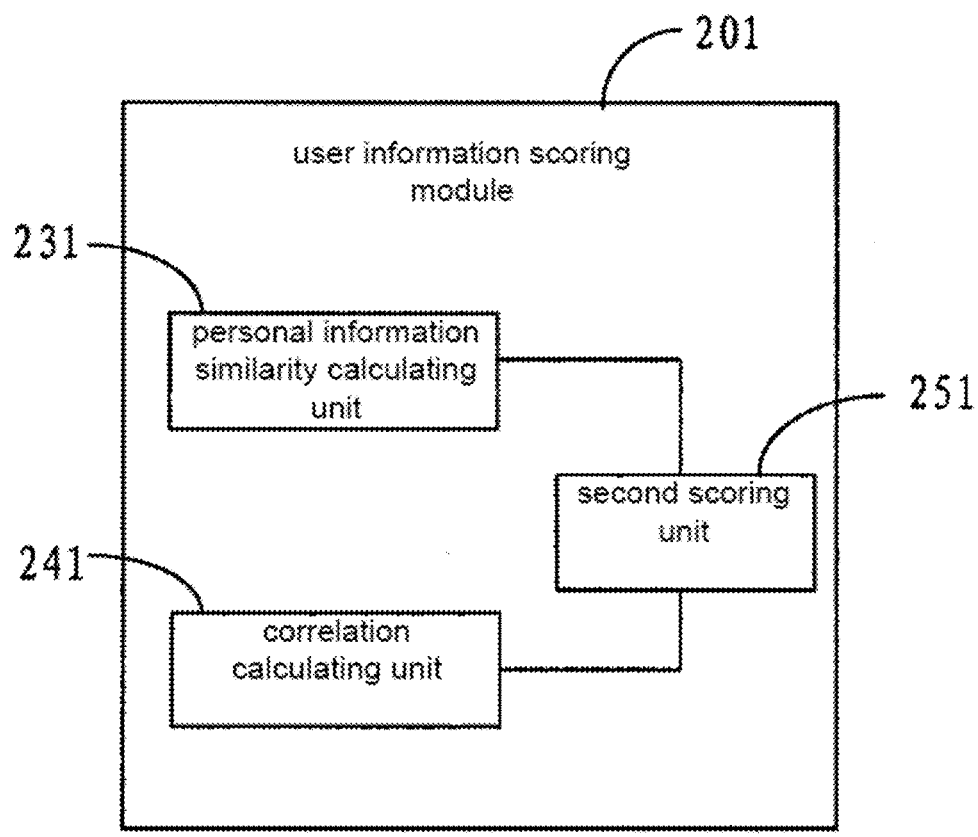
FIG. 12 is a schematic diagram illustrating a structure of the user information scoring module according to another embodiment.

In an embodiment, as shown in FIG. 12, the user information scoring module 201 includes: a personal information similarity calculating unit 231, a correlation calculating unit 241, a second scoring unit 251, wherein, the personal information similarity calculating unit 231 is configured to acquire the personal information of the micro-blog posting user and the personal information of the micro-blog requesting user, and calculate the similarity between the personal information of the micro-blog posting user and the personal information of the micro-blog requesting user.

In an embodiment, the personal information similarity calculating unit 231 may search a database, in which personal information of the users are stored, for the personal information corresponding to a user ID the by using the user ID. Specifically, the personal information may include: interests and hobbies, an educational background, a speciality, a region, a personalized signature, stored-up micro-blog information, the number of mutual friends, user-type information and the like. In an embodiment, the user type may be divided into: science & technology-type, entertainment-type, sports-type, art-type, politics-type and the like. In an example, the user-type information includes a user-type vector with a component thereof representing the score for the user's inclination to be of a certain user-type. For example, a first component of the user-type vector may be defined to represent a score for an inclination to be of the science & technology-type, and a second component may be defined to represent a score for an inclination to be of the entertainment-type, and so forth; if the score for an inclination to be of the science & technology-type is 3 and the score for an Inclination to be of the entertainment-type is 4, then the user-type vector may be represented as (3, 4, . . . ). In an example, a user type corresponding to a component with the highest score in the components of the user-type vector may be selected as the user type of the user.

In an embodiment, the user-type vector may be set by the user manually, or may be acquired by statistically analyzing user types of the micro-blog users concerned by the user and those of the user's friends. For example, if the number of users of the science & technology-type among the micro-blog users concerned by the user and the user's friends is 5, then the component corresponding to the science & technology-type in the user-type vector may be set as 5.

In an embodiment, if the users have same interests and hobbies or categories into which their interests and hobbies are classified are the same (e.g., the art category), then the personal information similarity calculating unit 231 may increase the score of the similarity between the micro-blog posting user and the micro-blog requesting user. In an embodiment, personal information similarity calculating unit 231 may search a database in which categories into which interests and hobbies are classified are stored for the category into which the user's interests and hobbies is classified. Accordingly, if the users have a same educational background (e.g., bachelors, or above PhDs), then the score of the similarity between the users may also be increased. Similarly, if the users have a same speciality e or a branch into which their specialities are classified, or the users are in a same region or area, or the users have a same keyword in their personalized signatures, or the users have same micro-blog information stored up, or the users have similar user-type information, or the number of mutual friends between the users exceeds a preset threshold, then the score of the similarity between the users may also be increased. In an embodiment, the similarity of the user-type information may also be acquired by calculating a distance between their user-type vectors. The smaller the distance between the two user-type vectors is, the higher the similarity of the user-type information is, and accordingly, the higher the similarity between the users is.

The correlation calculating unit 241 is configured to acquire interaction record between the micro-blog posting user and the micro-blog requesting user, and calculate a correlation between the micro-blog posting user and the micro-blog requesting user according to the interaction record.

In an embodiment, the interaction record includes records of citing, visiting, commenting and forwarding between the users. Specifically, if the number of times for the citing, visiting, commenting and forwarding between the users is large, then the correlation calculating unit 241 may set high correlation between the users accordingly.

The second scoring unit 251 is configured to score the micro-blog information according to the above similarity and correlation.

In an example. If there is a high similarity or correlation between the micro-blog posting user and the micro-blog requesting user, the second scoring unit 251 may increase the score of the micro-blog information.

In the embodiment, if there is a high similarity or correlation between the personal information of the micro-blog posting user and that of the micro-blog requesting user, the micro-blog information is also scored high. The micro-blog information with a high score is sorted to the top and is more liable to arouse the micro-blog requesting users' interest, and thus it is convenient for the user to view the micro-blog information of interest.

In an embodiment, the user information scoring module 201 includes an activeness calculating unit 211, a first scoring unit 221, a personal information similarity calculating unit 231, a correlation calculating unit 241, and a second scoring unit 251. The process that the second scoring unit 251 scores the micro-blog information may be performed based on the process that the first scoring unit 221 scores the micro-blog information, i.e., both the score acquired according to the activeness of the micro-blog posting user and the score acquired according to the similarity as well as the correlation between the personal information of the micro-blog posting user and that of the micro-blog requesting user are taken into account to get a comprehensive score of the micro-blog information, and each of the scores may be set a respective proportion of the comprehensive score.

Figure 13:
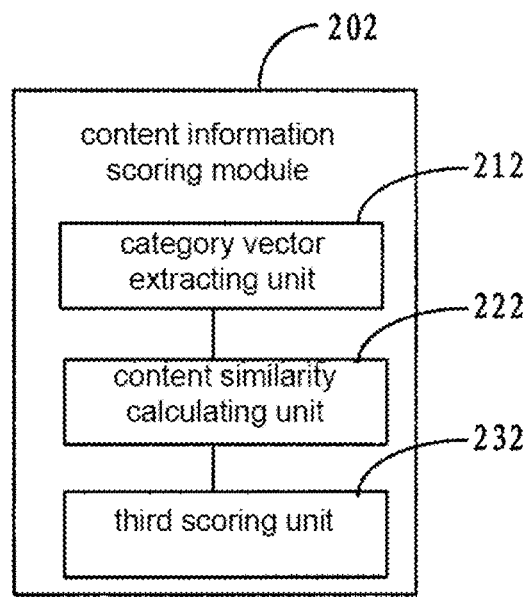
FIG. 13 is a schematic diagram illustrating a structure of a content information scoring module according to an embodiment.

In an embodiment, as shown in FIG. 13, the content information scoring module 202 includes: a category vector extracting unit 212, a content similarity calculating unit 222, and a third scoring unit 232, wherein, the category vector extracting unit 212 is configured to acquire the micro-blog content from the micro-blog information, and acquire a theme-category vector of the micro-blog content in the micro-blog information according to the micro-blog content as well as a characteristic of micro-blog theme category.

In an example, the micro-blog content includes a text content of the micro-blog, i.e., the content posted by the micro-blog posting user, and may also include a comment content of the micro-blog. In an embodiment. If the number of words for the micro-blog content is not large, then the category vector extracting unit 212 may acquire and combine several pieces of micro-blog contents, which are posted by the micro-blog posting user within a period (for example, a preset period) from the time point at which the micro-blog is posted.

In an example, the micro-blog theme category includes: politics and military affairs, culture and art, finance-economics and stock, emotion and life, social and legal affairs, entertainment and gossip, science & technology and network, health and food, physical culture and sports, automobile and house property, education and job hunting, fashion and travel, and the like. In an example, each component of the theme-category vector represents a score for a micro-blog content's inclination to be classified into a certain micro-blog theme category. For example, a first component of the theme-category vector represents a score for an inclination to be of the politics and military affairs category, and a second component represents a score for an inclination to be of the culture and art category, and so forth. The theme-category vector (5, 10, . . . ) represents that the score for the micro-blog content's inclination to be classified into the politics and military affairs category is 5, and the score for the micro-blog content's inclination to be classified into the culture and art category is 10. In an example, a micro-blog theme category corresponding to the component with the highest score may be selected as the micro-blog theme category into which the micro-blog contents are classified.

Specifically, characteristics of the micro-blog theme categories may be trained in advance. Further, the category vector extracting unit 212 may classify the micro-blog contents by using an existing naive Bayes text classification algorithm, to acquire the theme-category vector for each of the micro-blog contents, description of which will be omitted here.

The category vector extracting unit 212 is also configured to acquire a historical micro-blog content of the micro-blog requesting user, acquire the theme-category vector of the historical micro-blog content of the micro-blog requesting user according to the historical micro-blog content as well as the characteristic of the micro-blog theme category.

Specifically the category vector extracting unit 212 may acquire the micro-blog contents posted by the micro-blog posting user within a recent period (for example, a preset period). In an example, the category vector extracting unit 212 may average the several vectors as the theme-category vector of the historical micro-blog content of the micro-blog requesting user after acquiring the theme-category vectors of several pieces of the micro-blog contents.

The content similarity calculating unit 222 is configured to calculate a similarity between the micro-blog content in the micro-blog information and the historical micro-blog content of the micro-blog requesting user according to the theme-category vector of the micro-blog content in the micro-blog information and the theme-category vector of the historical micro-blog content of the micro-blog requesting user.

Specifically, the content similarity calculating unit 222 may calculate the similarity between the micro-blog content in the micro-blog information and the historical micro-blog content of the micro-blog requesting user by calculating the distance between the above two theme-category vectors. In an example, the smaller the distance is, the higher the similarity is set.

The third scoring unit 232 is configured to score the micro-blog information according to the similarity.

In an example, the higher the similarity is, the higher the micro-blog information is scored by the third scoring unit 232.

In the embodiment, if there is a high similarity between the micro-blog content in the micro-blog information and the historical micro-blog content of the micro-blog requesting user, then the micro-blog information is also scored high, and the micro-blog information with a high score is sorted close to the top and is more liable to arouse the micro-blog requesting users' interest, and thus it is convenient for the user to view the micro-blog information of interest.

Figure 14:
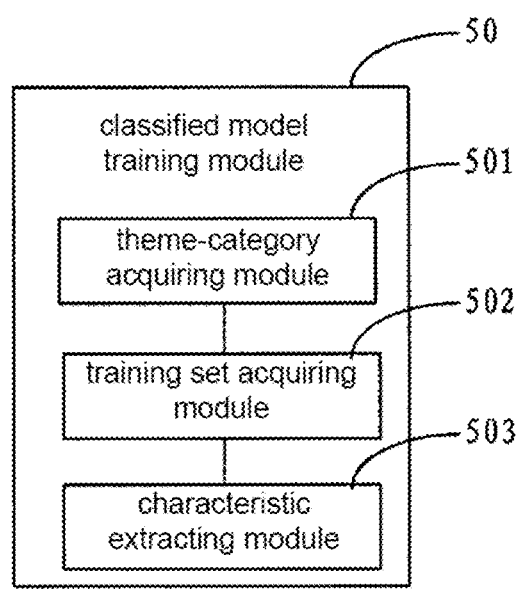
FIG. 14 is a schematic diagram illustrating a structure of a classified model training module according to an embodiment.

In an embodiment, it may be necessary to train the characteristics of the micro-blog theme categories in advance, and the above micro-blog sorting system also includes: a classified model training module 50 configured to train samples for each of the micro-blog theme categories and extract the characteristics of each of the micro-blog theme categories, as shown in FIG. 14, the classified model training module 50 includes: a theme-category acquiring module 501, a training set acquiring module 502, and a characteristic extracting module 503. The theme-category acquiring module 501 is configured to acquire the preset micro-blog theme category.

In an example, the micro-blog theme category includes: politics and military affairs, culture and art, finance-economics and stock, emotion and life, social and legal affairs, entertainment and gossip, science-technology and network, health and food physical culture and sports, automobile and house property, education and job hunting, fashion and travel, and the like.

The training set acquiring module 502 is configured to acquire a training subset of the micro-blog theme category.

In an example, in order to better extract the characteristic of the theme category from the training subset, micro-blog training samples may be acquired as many as possible within a certain range. In an embodiment, the training set acquiring module 502 may search the micro-blog using a key word of a respective micro-blog theme category, acquire an initial training subset of the micro-blog theme category, and perform the following steps repeatedly for a preset number of times: determining a high-frequency word in the initial training subset; searching the micro-blog using the high-frequency word, and adding a search result into the Initial training subset.

Specifically, the training set acquiring module 502 regards a name of a micro-blog theme category and split words thereof as the key words of the micro-blog theme category. For example, as for the politics and military affairs category, the training set acquiring module 502 may regard the words "politics", "military affair" as well as "politics and military affairs" as the key words of this category, and search the micro-blogs using these key words to acquire the initial training subset of this category. Further, after pre-processing the initial training subset, the training set acquiring module 502 may perform processes of splitting words and/or filtering stop words on the initial training subset, and determine the high-frequency word in the initial training subset. Further, the training set acquiring module 502 may continue to perform a search by using a high-frequency word or any combination of the high frequency words as the key word(s) to acquire more training samples of the micro-blogs, and repeatedly perform the steps of determining the high-frequency words in the initial training subset for a preset number of times, searching the micro-blog by using the high-frequency word regarded as the key word(s), and adding the search result into the initial training subset.

According to the method for acquiring the training subset of the micro-blog theme category in the embodiment, a large number of training samples of the micro-blogs may be acquired for each theme category, which provides a basis for extracting the characteristics of each of the micro-blog theme categories from the training subset.

The characteristic extracting module 503 is configured to extract the characteristic of the micro-blog theme category from the training subset.

Specifically, the characteristic extracting module 503 may train the micro-blog contents in the training subset of each of the theme categories by using an existing classified training approach and extract the characteristics of each of the theme categories, description of which will be omitted here.

In an embodiment, the above micro-blog sorting system also includes: a presenting-category classifying module (not shown) configured to classify the micro-blog content in the micro-blog information according to the preset micro-blog presenting category and acquire the presenting category into which the micro-blog content is classified.

Specifically, the presenting category may include the micro-blog theme categories mentioned above, such as the politics and military affairs category, culture and art category, finance-economics and stock category, and so on. The micro-blog theme category into which the micro-blog content is classified may be acquired according to the theme-category vector of the micro-blog content in the micro-blog information acquired in the category vector extracting unit 212, and the theme category corresponding to the component with the highest score in the theme-category vector may be selected as the micro-blog theme category into which the micro-blog content is classified.

In an embodiment, in addition to the micro-blog theme category, other presenting categories such as a friend-category, a location-category, a laughter-provoking category, a help-seeking and forwarding category, and an advertisement and activity category may also be added. Whether the micro-blog information is classified into the friend-category may be determined according to whether the micro-blog posting user and the micro-blog requesting user are friends. In an embodiment, the presenting-category classifying module may search a database, in which friendship correspondences are stored, using the IDs of the micro-blog posting user and the micro-blog requesting user to see whether the micro-blog posting user and the micro-blog requesting user are friends. Whether the micro-blog information is classified into the location-category may be determined based on whether addresses of the micro-blog posting user and the micro-blog requesting user are in the same region (may be set as county, district, etc.). Whether the micro-blog information is classified into the laughter-provoking category may be determined by searching a database, in which laughter-provoking scores of users are stored, with the ID of the micro-blog posting user and judging whether the searched out laughter-provoking score of the user is greater than the preset threshold. In an embodiment, the laughter-provoking score of the user may be acquired based on the laughter-provoking score scored by other users. Whether the micro-blog information is classified into the help-seeking and forwarding category or the advertisement and activity category may be determined based on appearance of high-frequency words related to the help-seeking or the advertisement.

In an embodiment, the micro-blog presenting category may also include a hot-topic category. Specifically, the presenting-category classifying module may parse a webpage content to acquire a high-frequency record, score the high-frequency record according to the historical micro-blog content of the micro-blog requesting user, and select the micro-blogs in the search result list as the hot-topic category according to the score of the high-frequency record.

In an example, the presenting-category classifying module may parse the webpage content according to an existing open-source tool Html-parser to acquire a phrase of which the occurrence number exceeds a preset threshold, i.e., a high-frequency record. Further, the presenting-category classifying module may score the high-frequency record according to the similarity between the high-frequency record and the historical micro-blog content of the micro-blog requesting user. Specifically, the presenting-category classifying module may determine the number of times that the high-frequency record occurs in the micro-blog contents which are posted, forwarded and commented by the micro-blog requesting user, and score the high-frequency record according to the number of times. Finally, the presenting-category classifying module may select the high-frequency record of which score is at a highest level (at which there may be a preset number of high-frequency records) and the micro-blog information in which the high-frequency record occurs in the micro-blog contents, and then classify the micro-blog information as the hot-topic category.

In this embodiment, a presenting module 40 is configured to present the micro-blog information according to the presenting categories into which the micro-blog contents are classified as well as the above sorted result.

Specifically, the presenting module 40 may present the micro-blog information according to each of the presenting categories, and sort the micro-blog information with a high score to the top in each of the presenting categories.

In this embodiment, the micro-blog information is divided into several presenting categories for presenting, which is convenient for the users to select their interested micro-blog categories to view, and thus is convenient for the users' operation. In addition, each of presenting categories is presented according to a descending order of the scores of the micro-blogs; for the micro-blog sorted to the top, the activeness of the micro-blog posting user is higher, or the similarity between the personal information of the micro-blog posting user and the personal information of the micro-blog requesting user is higher, or the correlation between the micro-blog posting user and the micro-blog requesting user is higher, thus convenient for the users to view the micro-blogs related to themselves and of interest.

As used herein, the terms "module" and "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term "module" and "unit" may include memory (shared, dedicated, or group) that stores code executed by the processor.

A method for micro-blog searching, in which a search result is sorted according to the above micro-blog sorting method, the step of acquiring the micro-blog information requested by a user includes: a search is performed using a key word input by the user to acquire the micro-blog information requested by the user.

Specifically, a search is performed using a key word input by the user by using a traditional search engine to find out the micro-blog information matched with the key word, thus to acquire the micro-blog information requested by the user.

In an embodiment, a micro-blog searching system is provided, which may include the above micro-blog sorting system, in which the micro-blog information acquiring module 10 is configured to perform a search using a key word input by the user, so as to acquire the micro-blog information requested by the user.

Specifically, the micro-blog information acquiring module 10 may perform a search using the key word input by the user by using a traditional search engine, to find out the micro-blog information matched with the key words, and thus acquire the micro-blog information requested by the user.

In an embodiment, a A-micro-blog presenting method is provided. In this method, a micro-blog requesting result is sorted according to the above micro-blog sorting method. Additionally, in this method, the step of acquiring the micro-blog information requested by a user includes: acquiring the micro-blog information requested by the user according to micro-blog requesting information corresponding to a user identifier.

In an embodiment, the step of presetting the micro-blog requesting information corresponding to the user identifier includes: acquiring the micro-blog information of the group corresponding to the user identifiers. For example, when the user logins to his/her micro-blog account, the micro-blog information acquiring module 10 may find a group concerned or listened to by the user and the user's friends according to the user identifier (e.g., a user ID), and acquire the micro-blog information of the group as well as the user's friends within a recent period, thus acquiring the micro-blog information requested by the user.

In an embodiment, a micro-blog presenting system is provided, which may includes the above micro-blog sorting system, in which the micro-blog information acquiring module 10 is configured to acquire the micro-blog information requested by the user according to the micro-blog requesting information corresponding to the user identifier.

In an embodiment, the step of presetting the micro-blog requesting information corresponding to the user identifier includes: acquiring the micro-blog information of the group corresponding to the user identities. For example, when the user logins to his/her micro-blog account, the micro-blog information acquiring module 10 may find the group concerned or listened to by the user and the user's friends according to the user identifier (e.g., a user ID), and acquire the micro-blog information of the group as well as the user's friends within a recent period, thus acquiring the micro-blog information requested by the user.

The ordinary skilled in the art may understand that all or part of the flow in the method of the embodiments may be implemented through associated hardware controlled by computer programs, which may be stored in a computer readable storage medium and may when executed include the flow mentioned in the embodiments of the above methods. Wherein, the storage medium may be a disk, an optical disk, a Read-Only Memory (ROM) or a Random Access Memory (RAM) and the like.

Figure 15:
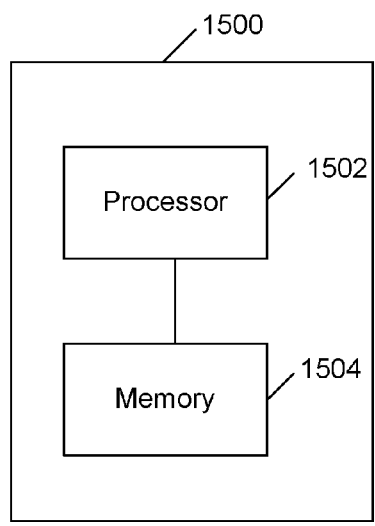
FIG. 15 is a structure schematic view illustrating a micro-blog sorting device according to an embodiment of the disclosure.

FIG. 15 is a structure schematic view illustrating a micro-blog sorting device according to an embodiment of the disclosure.

Herein, the micro-blog sorting device is implemented as a computer equipment 1500. This disclosure contemplates any suitable types of computer equipments 1500. As example and not by way of limitation, the computer equipment 1500 may include one or more servers. In an embodiment, software running on the one or more servers performs one or more steps of at least one of the methods as described referring to FIGS. 1 to 8 or implements functions of some or all of the various modules or units as described referring to FIGS. 9 to 14.

In an embodiment, the computer equipment 1500 includes a processor 1502 and a memory 1504. Although this disclosure describes and illustrates a particular computer equipment having a particular number of particular components in a particular arrangement, any suitable computer equipment having any suitable number of any suitable components can be contemplated.

In an embodiment, the processor 1502 includes hardware for executing instructions, for example, one or more computer programs. The processor 1502 may retrieve instructions from the memory 1504 and execute them. The processor 1502 may be implemented as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform one or more steps of at least one of the methods as described referring to FIGS. 1 to 8 or implements functions of some or all of the various modules or units as described referring to FIGS. 9 to 14.

In an embodiment, the memory 1504 may store instructions for the processor 1502 to execute or data for the processor 1502 to operate on. In an embodiment, the memory 1504 may include random access memory (RAM), which may be dynamic RAM (DRAM) or static RAM (SRAM) as desired. Additionally, the memory 1504 may include storage for storing data and instructions, such as read-only memory (ROM), such as mask-programmed ROM, programmable ROM (PROM), erasable PROM (EPROM), electrically erasable PROM (EEPROM), electrically alterable ROM (EAROM), or flash memory. In an embodiment, the storage may be internal or external to computer equipment 400. In an embodiment, the storage stores instructions for performing one or more steps of at least one of the methods as described referring to FIGS. 1 to 8 or for implementing functions of some or all of the various modules or units as described referring to FIGS. 9 to 14.

Herein, one or more computer readable storage media may be contemplated for implementing any suitable storage. In an embodiment, a computer readable storage medium may implement at least some portions of the memory 1504. For example, the computer readable storage medium may include both ROM and RAM. The computer readable storage medium may be implemented as a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or any other suitable computer-readable storage medium.

Figure 16:
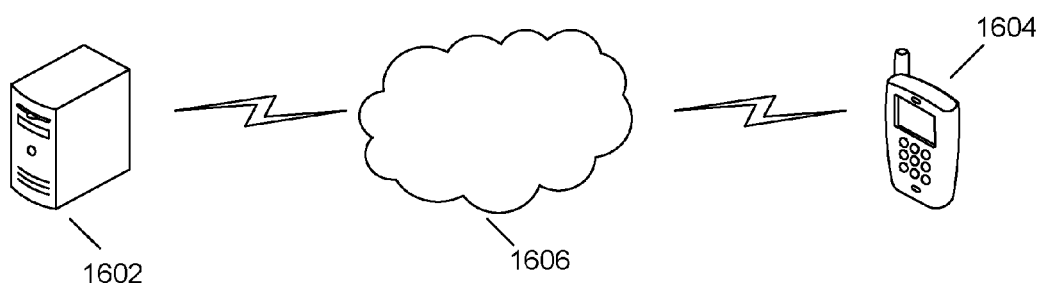
FIG. 16 illustrates a structure schematic view of a system for presenting micro-blogs to a user.

FIG. 16 illustrates a structure schematic view of a system for presenting micro-blogs to a user. As shown in FIG. 16, the system includes a network-side device 1602, and terminal-side device 1604, which may be connected to each other through a network 1606 (for example, Internet).

In an embodiment, the network-side device 1602 may be implemented as the computer equipment 1500 as described referring to FIG. 15, and thus the detailed description of the structure thereof is omitted here.

The terminal-side device 1604 may include, but is not limited to, a desktop computer, a laptop, a notebook, a tablet a mobile phone and other electronic equipment, or a client side application program.

In an embodiment, a micro-blog information requesting user uses the terminal-device device 1604 to transmit a request for micro-blog information to the network-side device 1602 through the network 1606, and the network-side device 1602, among other things, acquires micro-blog information requested by the terminal-side device 1604, extracts micro-blog posting user information and content information from the micro-blog information to score the micro-blog information, sorts the micro-blog information according to the score, and presents the micro-blog information according to a sorted result to the terminal-side device 1604 through the network 1606.

The embodiments described above which are specific and detailed merely describe several implementing modes of the present disclosure, however this cannot be understood as a limitation of the scope of the present disclosure. It should be noted that for the ordinary skilled in the art, various alterations and modifications may also be made without departing from the concept of the present disclosure, and all these shall fall in the protection scope of the present disclosure. Therefore, the protection scope of the present disclosure should be limited by the appended claims.

The invention claimed is:

1. A method, comprising:
   acquiring micro-blog information requested by a micro-blog requesting user;
   extracting micro-blog posting user information and content information from the micro-blog information to score the micro-blog information;
   sorting the micro-blog information according to the score; and
   presenting the micro-blog information according to a sorted result,
   wherein the extracting content information from the micro-blog information to score the micro-blog information comprises:
   acquiring a micro-blog content from the micro-blog information;
   acquiring a theme-category vector of the micro-blog content in the micro-blog information according to the micro-blog content and a characteristic of a micro-blog theme category;
   acquiring a historical micro-blog content of the micro-blog requesting user;
   acquiring a theme-category vector of the historical micro-blog content of the micro-blog requesting user according to the historical micro-blog content and the characteristic of the micro-blog theme category;
   calculating a similarity between the micro-blog content in the micro-blog information and the historical micro-blog content of the micro-blog requesting user according to the theme-category vector of the micro-blog content in the micro-blog information and the theme-category vector of the historical micro-blog content of the micro-blog requesting user; and
   scoring the micro-blog information according to the similarity.

2. The method according to claim 1, wherein the extracting micro-blog posting user information from the micro-blog information to score the micro-blog information comprises:
   acquiring a micro-blog manipulation record of the micro-blog posting user;
   calculating an activeness of the micro-blog posting user according to the micro-blog manipulation record; and
   scoring the micro-blog information according to the activeness.

3. The method according to claim 1, wherein the extracting micro-blog posting user information from the micro-blog information to score the micro-blog information comprises:
   acquiring personal information of the micro-blog posting user and personal information of the micro-blog requesting user;
   calculating a similarity between the personal information of the micro-blog posting user and the personal information of the micro-blog requesting user;
   acquiring an interaction record between the micro-blog posting user and the micro-blog requesting user;
   calculating a correlation between the micro-blog posting user and the micro-blog requesting user according to the interaction record; and
   scoring the micro-blog information according to the similarity and the correlation.

4. The method according to claim 1, further comprising: before extracting content information from the micro-blog information to score the micro-blog information,
   acquiring a preset micro-blog theme category;
   acquiring a training subset of the micro-blog theme category; and
   extracting the characteristic of the micro-blog theme category from the training subset.

5. The method according to claim 4, wherein the acquiring the training subset of the micro-blog theme category comprises:
   searching micro-blogs using a keyword of the micro-blog theme category, to acquire an initial training subset of the micro-blog theme category; and
   performing the following steps repeatedly for a preset number of times:
   determining a high-frequency word in the initial training subset; and
   searching the micro-blog according to the high-frequency word, and adding a search result into the initial training subset.

6. The method according to claim 1, further comprising: before presenting the micro-blog information according to the sorted result,
   classifying the micro-blog content in the micro-blog information according to the preset micro-blog presenting category, to acquire a presenting category, into which the micro-blog content is classified; and
   wherein the presenting the micro-blog information according to the sorted result comprises:
   presenting the micro-blog information according to the presenting category, into which the micro-blog content is classified, and the sorted result.

7. The method according to claim 1, wherein the acquiring micro-blog information requested by the micro-blog requesting user comprises:
   searching micro-blogs using a key word input by the micro-blog requesting user, to acquire micro-blog information requested by the micro-blog requesting user.

8. The method according to claim 1, wherein the acquiring micro-blog information requested by the micro-blog requesting user comprises: acquiring the micro-blog information requested by the micro-blog requesting user according to micro-blog requesting information corresponding to a user identifier.

9. The method according to claim 1, wherein the step of acquiring a theme-category vector of the historical micro-blog content of the historical micro-blog(s) posted by the micro-blog requesting user according to the historical micro-blog content of the historical micro-blog(s) posted by the micro-blog requesting user and the characteristic of the micro-blog theme category of the historical micro-blog(s) comprising:
  acquiring a plurality of historical micro-blogs posted by the micro-blog requesting user within a specified time period;
  acquiring a theme-category vector of the historical micro-blog content of each of the plurality of the historical micro-blogs according to the historical micro-blog content of the historical micro-blog and the characteristic of the micro-blog theme category of the historical micro-blog; and
  taking a average of the plurality of theme-category vectors as the resulting theme-category vector.

10. A system, comprising:
  a micro-blog information acquiring module, configured to acquire micro-blog information requested by a micro-blog requesting user;
  a scoring module, comprising a user information scoring module and a content information scoring module, wherein the user information scoring module is configured to extract micro-blog posting user information from the micro-blog information to score the micro-blog information according to the micro-blog posting user information; and the content information scoring module is configured to extract content information from the micro-blog information to score the micro-blog information according to the content information;
  a sorting module, configured to sort the micro-blog information according to the score; and
  a presenting module, configured to present the micro-blog information according to a sorted result,
  wherein the user information scoring module comprises:
  a category vector extracting unit, configured to acquire a micro-blog content from the micro-blog information, and acquire a theme-category vector of the micro-blog content in the micro-blog information according to the micro-blog content and a characteristic of a micro-blog theme category,
  wherein the category vector extracting unit is further configured to acquire a historical micro-blog content of historical micro-blog(s) posted by the micro-blog requesting user, acquire a theme-category vector of the historical micro-blog content of the historical micro-blog(s) posted by the micro-blog requesting user according to the historical micro-blog content of the historical micro-blog(s) posted by the micro-blog requesting user and the characteristic of the micro-blog theme category of the historical micro-blog(s);
  a content similarity calculating unit, configured to calculate a similarity between the micro-blog content in the micro-blog information and the historical micro-blog content of the micro-blog requesting user according to the theme-category vector of the micro-blog content in the micro-blog information and the theme-category vector of the historical micro-blog content of the micro-blog requesting user; and
  a third scoring unit, configured to score the micro-blog information according to the similarity.

11. The system according to claim 10, wherein the user information scoring module comprises:
  an activeness calculating unit, configured to acquire a micro-blog manipulation record of the micro-blog posting user and calculate an activeness of the micro-blog posting user according to the micro-blog manipulation record; and
  a first scoring unit, configured to score the micro-blog information according to the activeness.

12. The system according to claim 10, wherein the user information scoring module comprises:
  a personal information similarity calculating unit, configured to acquire personal information of the micro-blog posting user and personal information of the micro-blog requesting user, and calculate a similarity between the personal information of the micro-blog posting user and personal information of the micro-blog requesting user;
  a correlation calculating unit, configured to acquire an interaction record between the micro-blog posting user and the micro-blog requesting user, and calculate a correlation between the micro-blog posting user and the micro-blog requesting user according to the interaction record; and
  a second scoring unit, configured to score the micro-blog information according to the similarity and the correlation.

13. The system according to claim 10, further comprising:
a classified model training module, which comprises:
  a theme-category acquiring module, configured to acquire a preset micro-blog theme category;
  a training set acquiring module, configured to acquire a training subset of the micro-blog theme category; and
  a characteristic extracting module, configured to extract the characteristic of the micro-blog theme category from the training subset.

14. The system according to claim 13, wherein the training set acquiring module is configured to search micro-blogs according to a key word of the micro-blog theme category, acquire an initial training subset of the micro-blog theme category, and perform the following steps repeatedly for a preset number of times: determining a high-frequency word in the initial training subset; searching the micro-blog according to the high-frequency words, and adding a search result into the initial training subset.

15. The system according to claim 10, further comprising:
  a presenting-category classifying module, configured to classify the micro-blog content in the micro-blog information according to a preset micro-blog presenting category to acquire a presenting category into which the micro-blog content is classified,
  wherein the presenting module is further configured to present the micro-blog information according to the presenting category into which the micro-blog content is classified and the sorted result.

16. The system according to claim 10, wherein the micro-blog information acquiring module is configured to search the micro-blog using a key word input by the micro-blog requesting user, so as acquire the micro-blog information requested by the micro-blog requesting user.

17. The system according to claim 10, wherein the micro-blog information acquiring module is configured to acquire the micro-blog information requested by the micro-blog requesting user according to micro-blog requesting information corresponding to a user identifier.

18. The system according to claim 10, the category vector extracting unit is configured to:

acquire a plurality of historical micro-blogs posted by the micro-blog requesting user within a specified time period;

acquire a theme-category vector of the historical micro-blog content of each of the plurality of the historical micro-blogs according to the historical micro-blog content of the historical micro-blog and the characteristic of the micro-blog theme category of the historical micro-blog; and take a average of the plurality of theme-category vectors as the resulting theme-category vector.

19. A non-transitory computer-readable storage medium including instructions that, when executed, cause at least one processor to perform the following:

acquiring micro-blog information requested by a micro-blog requesting user;

extracting micro-blog posting user information and content information from the micro-blog information to score the micro-blog information;

sorting the micro-blog information according to the score; and presenting the micro-blog information according to a sorted result, wherein the extracting content information from the micro-blog information to score the micro-blog information comprises:

acquiring a micro-blog content from the micro-blog information;

acquiring a theme-category vector of the micro-blog content in the micro-blog information according to the micro-blog content and a characteristic of a micro-blog theme category;

acquiring a historical micro-blog content of historical micro-blog(s) posted by the micro-blog requesting user;

acquiring a theme-category vector of the historical micro-blog content of the the historical micro-blog(s) posted by the micro-blog requesting user according to the historical micro-blog content of the historical micro-blog(s) posted by the micro-blog requesting user and the characteristic of the micro-blog theme category of the historical micro-blog(s);

calculating a similarity between the micro-blog content in the micro-blog information and the historical micro-blog content of the micro-blog requesting user according to the theme-category vector of the micro-blog content in the micro-blog information and the theme-category vector of the historical micro-blog content of the micro-blog requesting user; and scoring the micro-blog information according to the similarity.

20. The non-transitory computer-readable storage medium according to claim 19, wherein the step of acquiring a theme-category vector of the historical micr-oblog content of the historical micro-blog(s) posted by the micro-blog requesting user according to the historical micro-blog content of the historical micro-blog(s) posted by the micro-blog requesting user and the characteristic of the micro-blog theme category of the historical micro-blog(s) comprising:

acquiring a plurality of historical micro-blogs posted by the micro-blog requesting user within a specified time period;

acquiring a theme-category vector of the historical micro-blog content of each of the plurality of the historical micro-blogs according to the historical micro-blog content of the 10 historical micro-blog and the characteristic of the micro-blog theme category of the historical micro-blog; and taking a average of the plurality of theme-category vectors as the resulting theme-category vector.

21. A system, comprising:

a processor; and a memory, coupled to the processor, and comprising instructions that, when executed, cause the processor to perform the following:

acquiring micro-blog information requested by a micro-blog requesting user;

extracting micro-blog posting user information and content information from the micro-blog information to score the micro-blog information;

sorting the micro-blog information according to the score; and presenting the micro-blog information according to a sorted result, wherein the extracting content information from the micro-blog information to score the micro-blog information comprises:

acquiring a micro-blog content from the micro-blog information;

acquiring a theme-category vector of the micro-blog content in the micro-blog information according to the micro-blog content and a characteristic of a micro-blog theme category;

acquiring a historical micro-blog content of historical micro-blog(s) posted by the micro-blog requesting user;

acquiring a theme-category vector of the historical micro-blog content of the historical micro-blog(s) posted by the micro-blog requesting user according to the historical micro-blog content of the historical micro-blog(s) posted by the micro-blog requesting user and the characteristic of the micro-blog theme category of the historical micro-blog(s);

calculating a similarity between the micro-blog content in the micro-blog information and the historical micro-blog content of the micro-blog requesting user according to the theme-category vector of the micro-blog content in the micro-blog information and the theme-category vector of the historical micro-blog content of the micro-blog requesting user; and scoring the micro-blog information according to the similarity.

22. The system according to claim 21, wherein the step of acquiring a 15 theme-category vector of the historical micro-blog content of the historical micro-blog(s) posted by the micro-blog requesting user according to the historical micro-blog content of the historical micro-blog(s) posted by the micro-blog requesting user and the characteristic of the micro-blog theme category of the historical micro-blog(s) comprising:

acquiring a plurality of historical micro-blogs posted by the micro-blog requesting user within a specified time period;

acquiring a theme-category vector of the historical micro-blog content of each of the plurality of the historical micro-blogs according to the historical micro-blog content of the historical micro-blog and the characteristic of the micro-blog theme category of the historical micro-blog; and taking a average of the plurality of theme-category vectors as the resulting theme-category vector.

* * * * *